United States Patent [19]

Hammond

[11] Patent Number: 4,708,630

[45] Date of Patent: Nov. 24, 1987

[54] APPARATUS FOR LABELING BLOW-MOLDED ARTICLES BY PLACING LABEL DIRECTLY ON THE PARISON

[75] Inventor: Edward P. Hammond, Cincinnati, Ohio

[73] Assignee: The Procter & Gamble Company, Cincinnati, Ohio

[21] Appl. No.: 864,366

[22] Filed: May 19, 1986

Related U.S. Application Data

[62] Division of Ser. No. 683,732, Dec. 19, 1984, abandoned.

[51] Int. Cl.$^4$ .............................................. B29C 49/24
[52] U.S. Cl. .................................... 425/504; 264/509; 264/540; 425/523
[58] Field of Search ............... 264/509, 536, 500, 540; 425/126 R, 503, 504, 522, 539, 540, 523

[56] References Cited

U.S. PATENT DOCUMENTS

| | | | |
|---|---|---|---|
| 1,551,847 | 9/1925 | Riley | 264/509 |
| 2,597,558 | 5/1952 | Bailey | 264/536 |
| 3,072,969 | 1/1963 | DuBois | 264/509 |
| 3,267,186 | 8/1966 | Battenfeld | 264/509 |
| 3,503,826 | 3/1970 | Nasica | 156/245 |
| 4,063,867 | 12/1977 | Janniere | 425/540 |
| 4,218,204 | 8/1980 | Edwards | 425/129 R |
| 4,233,262 | 11/1980 | Curto | 264/509 |
| 4,323,411 | 4/1982 | Uhlig | 156/245 |
| 4,605,462 | 8/1986 | Lehner | 264/509 |

Primary Examiner—Jay H. Woo
Assistant Examiner—Timothy W. Heitbrink
Attorney, Agent, or Firm—John J. Ryberg; E. Kelly Linman; John V. Gorman

[57] ABSTRACT

Apparatus for the in-mold labeling of a blow-molded, thermoplastic article wherein one or more labels are tangentially attached to the outer surface of an extruded parison at a predetermined location before the parison is expanded into a finished article.

12 Claims, 10 Drawing Figures

APPARATUS FOR LABELING BLOW-MOLDED ARTICLES BY PLACING LABEL DIRECTLY ON THE PARISON

This is a division of application Ser. No. 683,732, filed on Dec. 19, 1984, now abandoned.

TECHNICAL FIELD

The present invention pertains to a method and apparatus for labeling a blow-molded article, and more particularly to a method and apparatus for labeling a blow-molded article wherein one or more labels are attached to a parison at a predetermined location before the parison is blown into the finished article.

BACKGROUND OF THE INVENTION

The development of the plastic arts has resulted in the widespread use of plastics for a variety of products and applications. A notable example is in the packaging industry where plastic containers are commonly used to package virtually thousands of products, e.g., foods, beverages, detergents, chemicals, and motor oils. These containers can be made from a wide variety of thermoplastic materials such as polypropylene, polyethylene, or polyvinyl chloride. A common method of making thermoplastic containers from such materials is by blow molding, which typically includes the steps of forming a hollow tube of molten thermoplastic material (a "parison"), placing the parison inside a blow mold, expanding the parison by either injecting a pressurized gas into the parison or by creating a vacuum around the parison, maintaining the parison in such an expanded state while it cools and solidifies, and removing the finished container from the mold. U.S. Pat. No. 2,597,558, which issued on May 20, 1952 to Bailey, is representative of such a prior art blow molding method.

Where plastics are used to package goods, it is ordinarily desirable to label the container to provide information about the container and its contents such as brand name, size, composition, source, directions for use, and proper warnings. In addition, a well designed and colored label can significantly enhance the container's appearance and attractiveness. Prior art labeling techniques generally consist of either gluing a printed label to the finished container or directly printing the message on the container's outer surface with a suitable ink or paint. Unfortunately, these prior art methods are relatively expensive because of the additional handling steps required after the container has been molded.

In other prior art labeling techniques, the label is positioned and held on the inner surface of the blow mold cavity prior to blowing the container. This general type of labeling is commonly referred to as "in-mold labeling". One system of this type is shown, for example, in U.S. Pat. No. 3,267,186, which issued to Battenfeld on Aug. 16, 1966. In the method disclosed, a stamp having a series of vacuum passages connected to a vacuum source is used to cut a label from a preprinted strip. Once the label has been cut, the vacuum is activated which holds the label against the stamp's face. The stamp and vacuum-held label are then inserted and held within a complementary-shaped opening in the mold's sidewall such that the stamp becomes an integral part of the mold. When a parison is placed within the mold and injected with a pressurized gas, the parison expands and ultimately comes into adhesive contact with the label. After the parison has fully expanded and solidified, the vacuum to the stamp is shut off and the label adheres to the finished container.

Another prior art in-mold labeling method is shown in U.S. Pat. No. 3,072,969, which issued to Du Bois on Jan. 15, 1963. In the method disclosed, a label is placed on the interior surface of a blow mold in an area having a plurality of spaced air passages that are connected to a vacuum source. When activated, the vacuum holds the label in place while the thermoplastic parison is injected with a pressurized gas. When the expanding parison comes into contact with the label, the vacuum holding the label in place is shut off and the label adheres to the finished container.

While the above-described in-mold labeling methods achieve the basic objective of labeling a blow-molded container, they all share the major disadvantage of requiring a relatively complicated, difficult to make, and expensive blow mold. Furthermore, in the situation where a single parison station serves multiple blow molds, each mold requires the above described complex and expensive vacuum system. Accordingly, it is a primary objective of the present invention to provide an improved in-mold labeling method for blow molded, thermoplastic articles that uses a standard and inexpensive mold.

Another object of the present invention is to reduce the complexity and expense of an in-mold labeling machine by a factor equal to the ratio of mold cavities to parison stations in the situation where a single parison station serves multiple mold cavities.

Another object of the present invention is to label a blow-molded article during the molding operation, thereby eliminating subsequent labeling and handling operations.

Another object of the present invention is to label a blow-molded article during the molding operation, thereby improving the quality of label adhesion and appearance.

SUMMARY OF THE INVENTION

The present invention provides an improved method of attaching one or more labels to a bottle or other similar article that is blow-molded from a thermoplastic material. According to one embodiment of the present invention, a parison is extruded from a mass of molten thermoplastic material such as high density polyethylene (HDPE). During the extrusion process, one or more labels are brought into tangential contact with and adhere to the parison's tacky surface in a pre-selected area that substantially corresponds to the label-bearing surface of the finished article. After the parison has been fully extruded, two halves of a blow mold are closed around the parison with its tacked-on labels. Immediately thereafter, a hot knife severs the top portion of the parison from the extrusion nozzle. A blow pin then enters a small opening in the top of the blow mold and extends down into the top portion of the hollow parison. Once the blow pin is properly seated, compressed air is injected through the blow pin and into the parison. The compressed air expands the label-bearing parison until the thermoplastic material takes the shape of the mold's interior surface. In this expansion process, the labels are smashed between the expanded thermoplastic material and the mold's interior surface such that the labels become slightly imbedded in and adhere to the expanded thermoplastic material. The fully-expanded article is then allowed to cool and solidify before the mold halves are opened and the labeled article is removed.

In a particularly preferred embodiment of the above-described process, the labels have a slight coating of thermoplastic material on their parison-contacting surface. When the labels are brought into tangential contact with the hot parison, the labels' thermoplastic coating in contact with the parison melts and mixes with the hot parison material, thereby causing the labels to better adhere to the parison than when non-coated labels are used. When the parison is injected with a pressurized gas and expanded, the labels' entire thermoplastic coating melts and mixes with the hot parison material. After the finished article is cooled and removed from the blow-mold, the resultant bond between the labels and the finished article is significantly stronger than the resultant bond when non-coated labels are used.

BRIEF DESCRIPTION OF THE DRAWINGS

While the specification concludes with claims that particularly point out and distinctly claim the subject matter regarded as forming the present invention, it is believed that the invention will be better understood from the following description and drawings in which:

DETAILED DESCRIPTION OF THE INVENTION

It should be noted that although the following description and illustrations are specifically directed to labeling a blow-molded thermoplastic bottle, the present invention may be applied with equal facility to any type of blow-molded article. Furthermore, it is to be understood that the present invention can be practiced where two or more labels are either simultaneously or sequentially attached to a parison's outer surface. However, for the sake of clarity and to avoid redundancy, the following description and illustrations only show one label being attached to a parison's outer surface.

Figure 1:
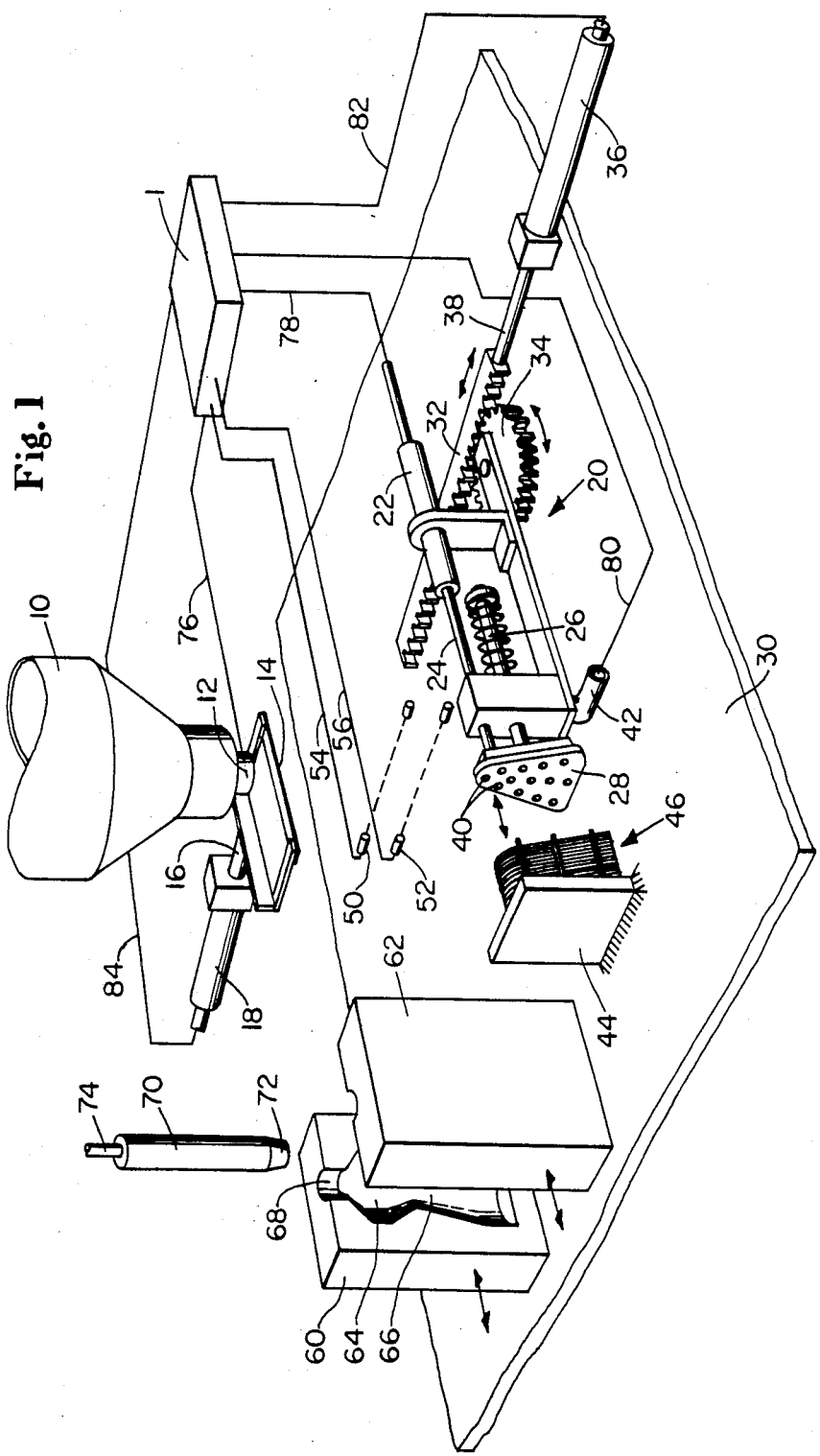
FIG. 1 is a schematic view showing an exemplary apparatus for applying a label to an extruded parison.

Referring now to the drawings, FIG. 1 is a schematic illustration of an exemplary apparatus that can be utilized in practicing the present invention. For introductory purposes, FIG. 1 will first be referred to in describing the apparatus' various components. Thereafter, FIGS. 2-7 will be referred to in describing how the components operate in working relation to one other.

As shown in FIG. 1, bulk hopper 10 contains a supply of molten, thermoplastic material such as high-density polyethylene (HDPE). Directly below and in fluid communication with hopper 10 is an extrusion nozzle 12 from which parisons are extruded. A laterally-moving, electrically-heated knife 14, which is used to sever parisons from nozzle 12 once they have been fully extruded, is located below hopper 10 and adjacent to extrusion nozzle 12. Knife 14 is attached to a moveable shaft 16 that extends from an actuator 18. Actuator 18 is a pneumatic actuator; however, as will be apparent to those skilled in the art, actuator 18 and all other actuators shown in FIG. 1 and later referred to can be hydraulic or electric.

Located further below and off to the side of extrusion nozzle 12 and hopper 10 is a label applicator, generally denoted as 20. Label applicator 20 comprises an actuator 22, a moveable shaft 24 extending from actuator 22, a spring-loaded return shaft 26, and a plate 28 attached to the ends of shafts 24 and 26. Label applicator 20 is mounted on surface 30 and is rotatable by means of a rack 32, a pinion 34, an actuator 36, and a moveable shaft 38 extending from actuator 36 and attached to the near end of rack 32.

Still referring to FIG. 1, plate 28 has a plurality of small air passageways 40 that are connected to a vacuum source (not shown) via air line 42 and moveable shaft 24. As will be more thoroughly described later, the vacuum supplied to air passageways 40 enables plate 28 to grasp a discrete label from a label hopper 44 when plate 28 is thrust forward by actuator 22. Hopper 44 contains any number of stacked labels, generally indicated as 46, that are spring-loaded by means of spring 48 (see FIG. 2). In a preferred embodiment, labels 46 are made of paper with their side facing plate 28 having printed graphics and their opposite side having a thin thermoplastic coating, e.g. a hot melt adhesive. The purpose and advantage of having a thin thermoplastic coating on one side of labels 46 will be explained later.

Also shown in FIG. 1 are a first and second pair of electric eyes, 50 and 52 respectively, which are located below and off to the side of extrusion nozzle 12. Eyes 50 and 52 are carefully positioned such that their beam paths are interrupted when a parison is extruded from nozzle 12. Eyes 50 and 52 are electrically connected via lines 54 and 56, respectively, to central control unit (CCU) 1, which performs the critical function of providing the timing signals necessary to coordinate and activate the movement of the apparatus' various components.

Mold halves 60 and 62, shown in their open position, are laterally movable directly below nozzle 12 to receive a parison after it has been fully extruded. When closed, mold halves 60 and 62 define a cavity 64 with the cavity's surface 66 having the shape of the final article to be molded, such as a bottle as shown. Finally, a blow pin 70, which is connected to a source of compressed gas (not shown) via line 74, is located directly above mold halves 60 and 62 and is used to expand an extruded parison into a finished article. Blow pin 70 has a tapered tip 72 that sealingly engages opening 68 and the top portion of the parison when blow pin 70 is brought down after blow mold halves 60 and 62 are closed.

FIGS. 2-7 show the apparatus of FIG. 1 going through the sequential steps of attaching one or more labels to an extruded parison before the parison is expanded into a finished article, such as bottle or container. Once again, in the following description, actuators 18, 22, and 36 are pneumatic actuators that are appropriately connected to an air pressure/vacuum source (not shown). However, as will be readily apparent to those skilled in the art, these actuators can also be hydraulic or electrical.

Figure 2:
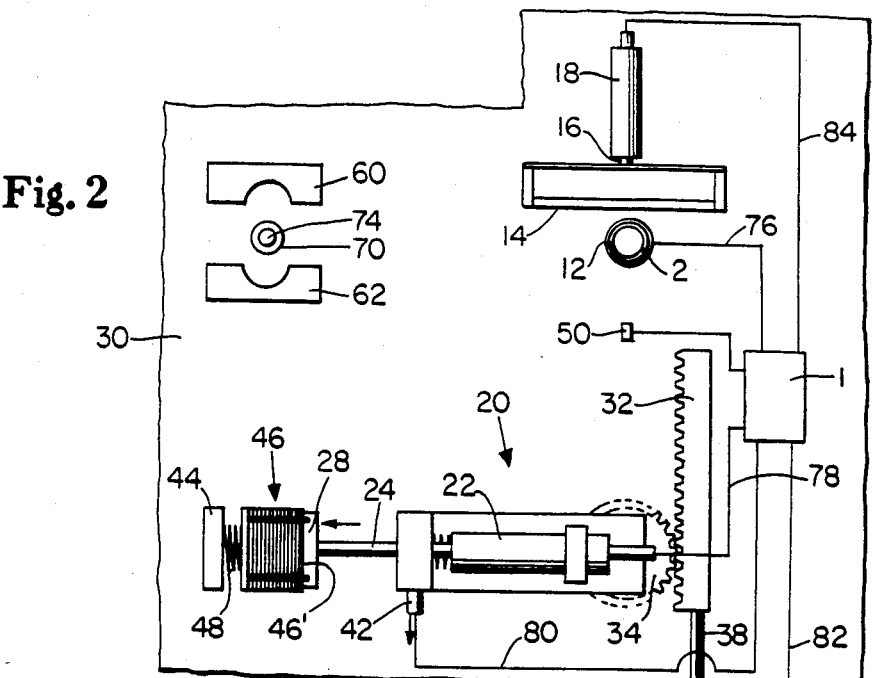
FIGS. 2-4 are plan views of the apparatus of FIG. 1 that show the apparatus' label applicator component going through the sequential steps of grasping a label from a label hopper.
Figure 3:
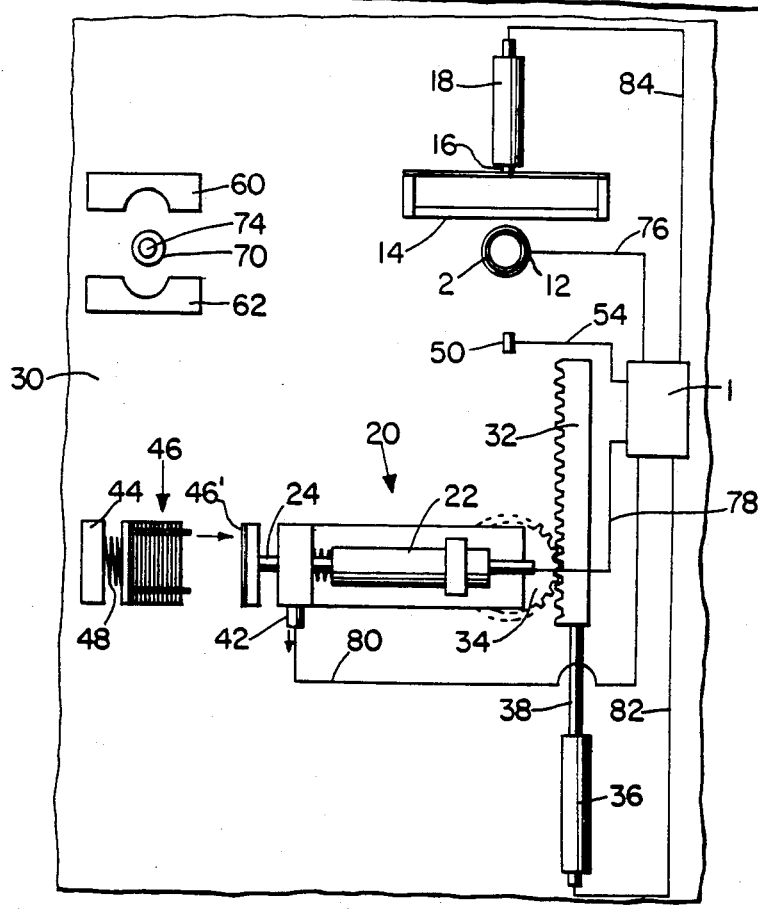

Referring to FIG. 2, CCU 1 sends a signal via line 76 to extrusion nozzle 12 to begin extruding parison 2. Simultaneously, CCU 1 sends a signal via line 78 to actuator 22 to thrust moveable shaft 24 with attached plate 28 forward such that plate 28 comes into slight contact with first label 46' in label hopper 44. Just before plate 28 comes into contact with first label 46', CCU 1 supplies vacuum to the small air passageways 40 located on the face of plate 28 (see FIG. 1) via line 80 and airline 42. The vacuum supplied to air passageways 40 enables plate 28 to firmly grasp first label 46', as can be seen in FIG. 3. As soon as plate 28 has grasped label 46', CCU 1 discontinues the energizing signal that was sent to actuator 22, which causes spring-loaded shaft 26 to pull plate 28 with its grasped label 46' away from label hopper 44, as can also be seen in FIG. 3.

Figure 4:
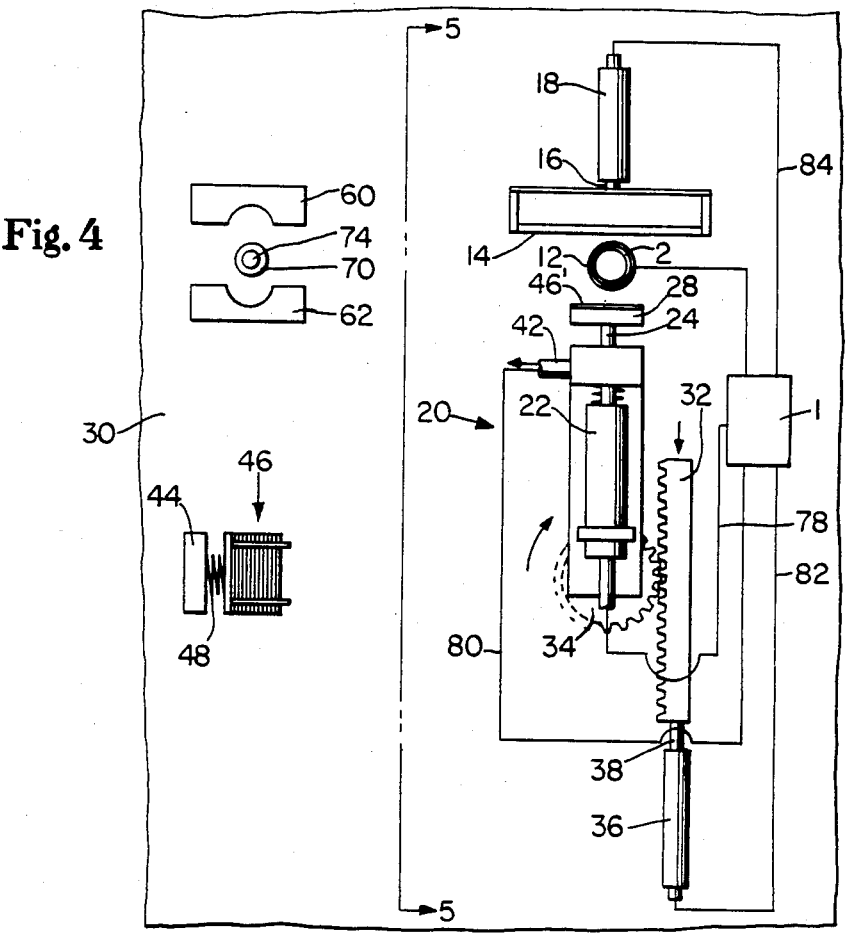

Referring now to FIG. 4, as soon as plate 28 with attached label 46' has snapped back to its original position, CCU 1 sends a signal via line 82 to actuator 36 to draw moveable shaft 38 and rack 32 inward toward actuator 36. The movement of rack 32 in turn rotates pinion gear 34 90° such that label applicator 20 and plate 28 with attached label 46' face in the direction of extrusion nozzle 12. Label applicator 20 is now in position to attach label 46' to the parison while it is extruded from nozzle 12.

Figure 5:
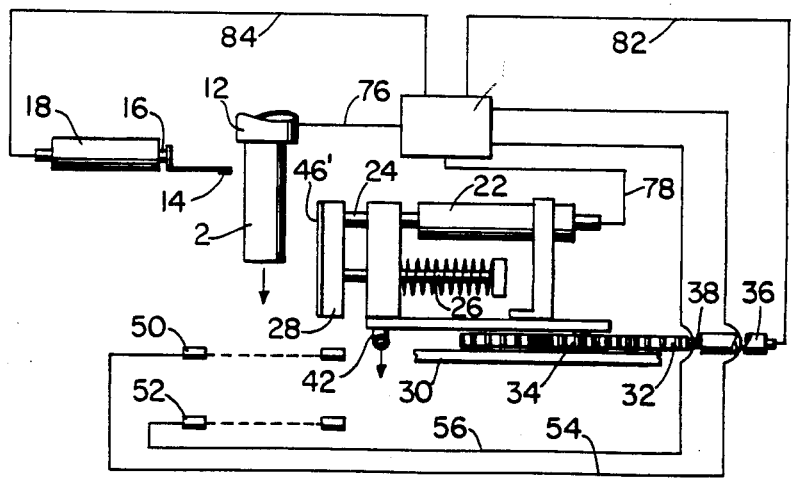
FIGS. 5-7 are side views of the apparatus taken along line 5—5 of FIG. 4 that show the apparatus' label applicator component going through the sequential steps of applying a label to a parison while it is being extruded from an extrusion nozzle.
Figure 6:
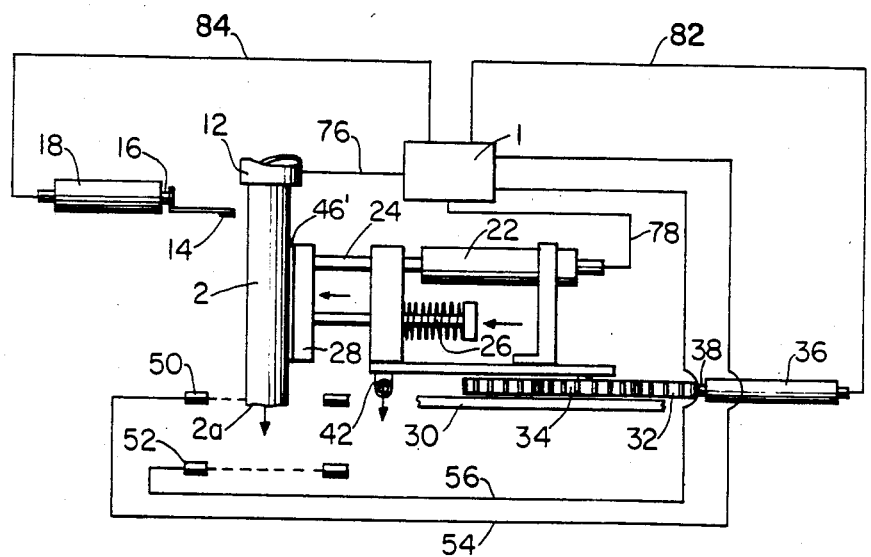
Figure 7:
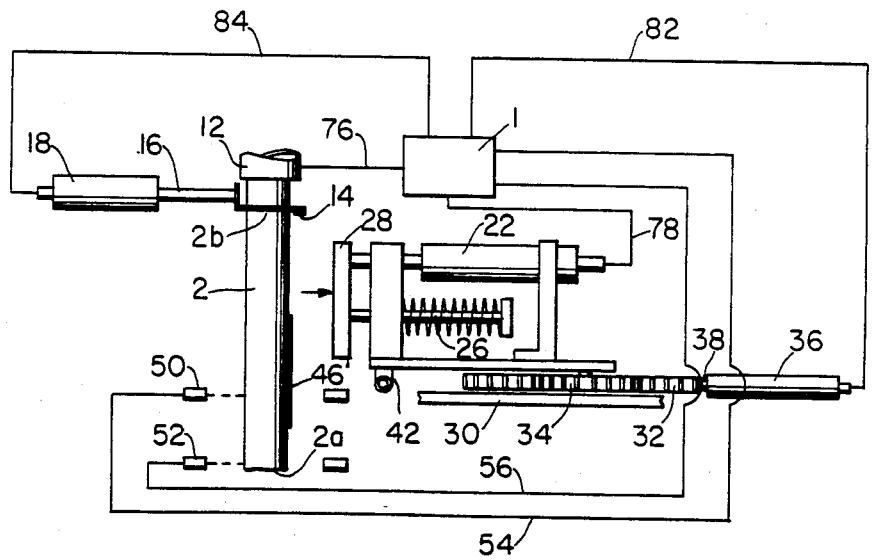

FIGS. 5–7 show label applicator 20 attaching label 46' to parison 2 while it is being extruded from extrusion nozzle 12. In FIG. 5, parison 2 is shown "growing" as it travels downward adjacent to label applicator 20. As earlier described, a first and second pair of electric eyes 50 and 52, respectively, are located below nozzle 12 and carefully positioned such that their beam paths are interrupted by "growing" parison 2 during the extrusion process. As seen in FIG. 6, parison 2 has "grown" such that its leading edge 2a interrupts beam path of first electric eye device 50. At this precise moment, first electric eye device 50 sends a signal to CCU 1 via line 54 to send a signal to actuator 22 via line 78 to immediately thrust shaft 24 and plate 28 with attached label 46' forward such that label 46' comes into slight tangential contact with the tacky outer surface of parison 2. As described earlier, this area of contact on the parison's outer surface substantially corresponds to the label-bearing surface of the finished article. Therefore, the vertical placement of first electric eye device 50 is important in order to attach label 46' to this corresponding surface on the parison. It is suggested that several "trial runs" with adjustments to the vertical location of eye 50 in between should be carried out in order to "zero in" on the proper label placement.

Still referring to FIG. 6, as soon as plate 28 has brought label 46' into slight tangential contact with parison 2, CCU 1 discontinues the vacuum supplied to the small air passageways 40 on plate 28 whereby plate 28 releases its "grip" on label 46'. When released from plate 28, label 46' adheres to the parison because of the parison's tacky surface condition. As briefly mentioned earlier, label 46' preferably has a very slight coating of thermoplastic material on its parison-facing surface that melts and mixes with the parison's outer surface, thereby enhancing the grip that parison 2 has on label 46'.

FIG. 7 shows parison 2 with tacked on label 46' fully extruded. As seen in FIG. 7, the parison's leading edge 2a interrupts the path of second electric eye device 52. The resultant signal from second electric eye 52 is received by CCU 1 via line 56, which tells CCU 1 to simultaneously: (a) send a signal to extrusion nozzle 12 via line 76 to stop extruding the parison, (b) send a signal to mold halves 60 and 62 to move under extrusion nozzle 12 and close around parison 2, and (c) send a signal to actuator 18 via line 84 to thrust hot knife 14 forward and sever the top portion 2b of parison 2 from the extrusion nozzle 12, this later step being illustrated in FIG. 7. The apparatus is now ready to begin another cycle starting with the step described in conjunction with FIG. 2.

In a particularly preferred embodiment, the vertical location and spacing of electric eyes 50 and 52 are readily adjustable to take into account the size of the finished article as well as the location of the label. In addition, a multiplicity of electric eye pairs can be used to provide timing signals for numerous labels to be applied to the parison.

Figure 8:
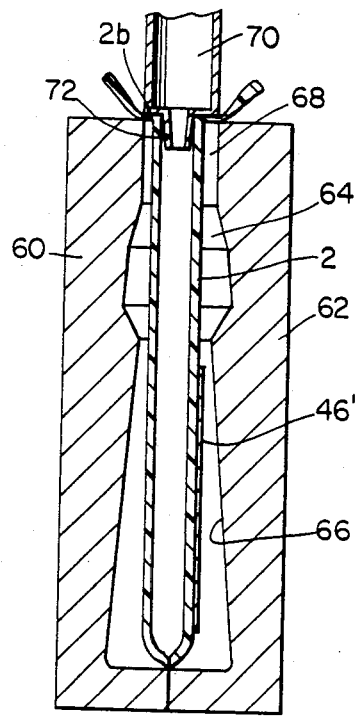
FIGS. 8 and 9 are cross-sectional views of a blow mold that sequentially show an extruded parison having a tacked-on label being expanded into a labeled, finished article.
Figure 9:
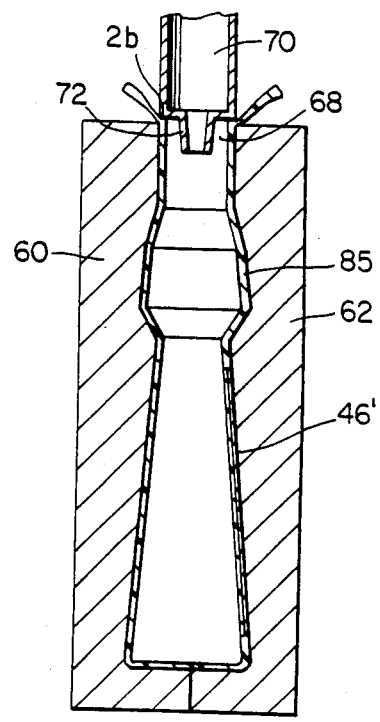

FIGS. 8 and 9 sequentially show severed parison 2 with its tangentially attached label 46' being blown into a finished article while inside closed blow mold halves 60 and 62. As shown in FIG. 8, after mold halves 60 and 62 have closed to define a cavity 64 around parison 2, blow pin 70 is brought down such that tapered tip 72 sealingly engages both opening 68 at the top of the blow mold and the top portion 2b of parison 2. Once tip 72 is properly seated, a high-pressure gas is injected into parison 2 through blow pin 70. The injected gas expands parison 2 such that its outer surface comes into contact with the interior surface 66 of cavity 64, as seen in FIG. 9, thereby defining the final shape of article 85. Alternatively, parison 2 can be expanded by creating a vacuum within cavity 64, which is another technique commonly utilized in the blow molding industry. Regardless of which type of system is used, label 46' is smashed between the expanding parison's outer surface and the interior surface 66 of cavity 64 and becomes somewhat embedded in and substantially flush with the outer surface of article 85. As described earlier, if label 46' has a thin coating of thermoplastic material on its parison-contacting surface, the hot parison will melt and mix with the coating. Upon cooling, the bond between the finished article 85 and label 46' is much stronger than when a non-coated label is used.

Figure 10:
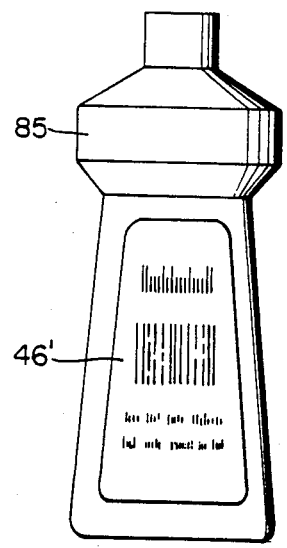
FIG. 10 is a front view of a blow-molded bottle that was labeled by the present invention.

After parison 2 has been fully expanded, the pressure inside expanded parison 2 is maintained long enough to allow the thermoplastic material to cool and solidify. Mold halves 60 and 62 are then separated and the finished article 85 with its attached label 46' is removed (see FIG. 10).

EXAMPLE

The present invention was practiced on a modified Kautex Blow Molding Machine type KEB 4/13-560/18, available from Kautex Maschinenbau GMBH, West Germany. The thermoplastic material used was 5602A high-density polyethylene (HDPE), which is available from Chemplex of Rolling Meadows, Ill.

The thermoplastic material was heated to approximately 200° C. A parison approximately 33 cm long was extruded through an extrusion nozzle comprising an 18 mm oval die bushing and 16 mm die pin. Approximately halfway through the parison extrusion process, two substantially tear-shaped, hot melt glue-coated, 11×8.3 cm paper stock labels were tangentially brought into contact with opposite sides of the hot, tacky parison that substantially corresponded to the label-bearing surface of the finished article. Several trial runs with vertical adjustments to the first eye device in between were required before this correct location on the parison's surface was "zeroed in" on.

After the parison was fully extruded, two halves of a blow mold were moved to either side of the parison. When the two mold halves closed around the parison, a hot knife severed the fully "grown" parison from the extrusion nozzle. A blow pin located above the closed blow mold was then lowered such that its tapered tip sealingly engaged both an opening in the top surface of the blow mold and the top portion of the parison. Once the blow pin was firmly seated within the opening, compressed air was injected into the parison at approximately 5 bars (approximately 75 psi) for about 10 seconds. The pressurized gas expanded the parison until the parison and its tacked-on labels were firmly pressed against the mold cavity's interior surface. The cavity's cold surface cooled the expanded thermoplastic material until it solidified and took its permanent shape. Thereafter, the two mold halves were opened and the labeled article was removed.

An apparatus and method is thus provided for labeling a blow-molded article wherein one or more labels are placed directly on the parison prior to expanding the parison into the finished article. The apparatus shown has been somewhat simplified so that a person skilled in the art can readily understand the preceding description and economically incorporate the present invention into a high-speed, blow-molding operation by making any number of minor changes and modifications, none of which entail a departure from the spirit and scope of the present invention. Accordingly, the following claims are intended to embrace all such changes and modifications.

What is claimed is:

1. An apparatus for attaching at least one label to the outer surface of a blow-molded article during the formation of said article, said apparatus comprising:
   (a) means for forming a parison from a heated mass of thermoplastic material, said parison having an outer surface;
   (b) means for tangentially attaching said label to said outer surface of said parison;
   (c) means for placing said parison with said tangentially attached label inside a blow mold cavity having an interior surface;
   (d) means for expanding said parison with said tangentially attached label such that said outer surface of said parison and said tangentially attached label come into contact with said interior surface of said blow mold cavity, whereby said label is attached to said outer surface of said blow-molded article; and
   (e) means for removing said blow-molded article with said attached label from said blow mold cavity.

2. The apparatus recited in claim 1 wherein said means for forming a parison comprises an extruder.

3. The apparatus recited in claim 1 wherein said means for forming a parison comprises an injection molder.

4. The apparatus recited in claim 1 wherein said means for expanding said parison with said tangentially attached label comprises a nozzle for injecting said parison with a pressurized gas.

5. The apparatus recited in claim 1 wherein said means for expanding said parison comprises a source of pressurized gas in fluid communication with said parison.

6. The apparatus recited in claim 1 wherein said means for expanding said parison comprises a vacuum source in fluid communication with the interior surface of said blow mold cavity.

7. An apparatus for making a blow-molded article having an outer surface with at least one label attached thereto at a final predetermined location, said label having been attached to the outer surface of a parison at an initial predetermined location prior to expanding said parison into said blow-molded article, said apparatus comprising:
   (a) means for forming said parison from a heated mass of thermoplastic material, said parison having said outer surface;
   (b) means for tangentially attaching said label to said outer surface of said parison at said initial predetermined location;
   (c) means for placing said parison with said tangentially attached label inside a blow mold cavity having an interior surface;
   (d) means for expanding said parison with said tangentially attached label such that said outer surface of said parison and said tangentially attached label come into contact with said interior surface of said blow mold cavity, whereby said label is attached to said outer surface of said blow-molded article at said final predetermined location; and
   (e) means for removing said blow-molded article having said label attached thereto at said final predetermined location thereto.

8. The apparatus recited in claim 7 wherein said means for forming a parison comprises an extruder.

9. The apparatus recited in claim 7 wherein said means for forming a parison comprises an injection molder.

10. The apparatus recited in claim 7 wherein said means for expanding said parison with said tangentially attached label comprises a nozzle for injecting said parison with a pressurized gas.

11. The apparatus recited in claim 7 wherein said means for expanding said parison comprises a source of pressurized gas in fluid communication with said parison.

12. The apparatus recited in claim 7 wherein said means for expanding said parison comprises a vacuum source in fluid communication with the interior surface of said blow mold cavity.

* * * * *